(12) United States Patent
Höglund et al.

(10) Patent No.: US 12,126,568 B2
(45) Date of Patent: Oct. 22, 2024

(54) METHODS AND DEVICES FOR MANAGING TRANSMISSIONS IN A WIRELESS COMMUNICATIONS NETWORK

(71) Applicant: Telefonaktiebolaget LM Ericsson (PUBL), Stockholm (SE)

(72) Inventors: Andreas Höglund, Solna (SE); Gerardo Agni Medina Acosta, Märsta (SE); Sandeep Narayanan Kadan Veedu, Täby (SE); Emre Yavuz, Stockholm (SE); Tuomas Tirronen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 370 days.

(21) Appl. No.: 17/598,979

(22) PCT Filed: Mar. 27, 2020

(86) PCT No.: PCT/EP2020/058780
§ 371 (c)(1),
(2) Date: Sep. 28, 2021

(87) PCT Pub. No.: WO2020/201122
PCT Pub. Date: Oct. 8, 2020

(65) Prior Publication Data
US 2022/0182205 A1 Jun. 9, 2022

Related U.S. Application Data

(60) Provisional application No. 62/825,901, filed on Mar. 29, 2019.

(51) Int. Cl.
*H04L 5/00* (2006.01)

(52) U.S. Cl.
CPC ................... *H04L 5/0055* (2013.01)

(58) Field of Classification Search
CPC ..... H04L 1/1671; H04L 5/0055; H04L 5/001; H04L 27/006; H04L 5/0094;
(Continued)

(56) References Cited

U.S. PATENT DOCUMENTS

| 10,749,640 B2 * | 8/2020 | Kim ..................... H04L 5/0055 |
| 2013/0083741 A1 * | 4/2013 | Larsson ................ H04W 52/48 370/329 |

(Continued)

FOREIGN PATENT DOCUMENTS

| GB | 2580913 A1 | 8/2020 |
| WO | 2004088876 A1 | 10/2004 |

OTHER PUBLICATIONS

NPL Document, Consideration for preconfigured uplink resources (PUR)) France, Mar. 28, 2019 (Year: 2019).*

(Continued)

*Primary Examiner* — Mewale A Ambaye
(74) *Attorney, Agent, or Firm* — Baker Botts L.L.P.

(57) ABSTRACT

Methods of operating a network node in a communication network are provided. Operations according to such methods include receiving a transmission that is sent by a user equipment, UE, and that is received over a preconfigured uplink resource, PUR and selecting one or more transmission types for indicating feedback corresponding to the received transmission conditioned to having been successfully received.

14 Claims, 10 Drawing Sheets

(58) Field of Classification Search
CPC ........ H04L 1/1812; H04L 1/16; H04W 72/04; H04W 72/12; H04W 4/70
See application file for complete search history.

(56) References Cited

U.S. PATENT DOCUMENTS

| | | | | |
|---|---|---|---|---|
| 2014/0161111 | A1* | 6/2014 | Kim | H04W 56/0045 370/336 |
| 2018/0359064 | A1* | 12/2018 | Kim | H04W 74/0833 |
| 2021/0050950 | A1* | 2/2021 | Zhou | H04W 76/14 |
| 2022/0124780 | A1* | 4/2022 | Lei | H04L 1/1893 |

OTHER PUBLICATIONS

UL transmission in preconfigured resources for NB-IoT Athens, Greece. Feb. 16, 2019 (Year: 2019).*
Office Action issued for Chinese Patent Application No. 202080025217.1—Aug. 17, 2023.
3GPP TS 36.331 v15.2.1; Technical Specification; 3rd Generation Partnership Project; Technical Specification Group Radio Access Network; Evolved Universal Terrestrial Radio Access (E-UTRA); Radio Resource Control (RRC); Protocol specification (Release 15)—Jun. 2018.
3GPP TSG RAN WG1 Meeting #96; Athens, Greece; Source: Intel Corporation; Title: UL transmission in preconfigured resources for NB-IoT (R1-1902458)—Feb. 25-Mar. 1, 2019.
3GPP TSG RAN WG1 Meeting #96; Xi'An, China; Source: Sequans Communications; Title: Consideration for preconfigured uplink resources (PUR) (R1-1904748)—Apr. 8-12, 2019.
3GPP TSG-RAN2 meeting #105; Athens, Greece; Source: ZTE Corporation; Sanechips; Title: Further consideration on DL aspects of D-PUR in IDLE (R2-1901479)—Feb. 25-Mar. 1, 2019.
PCT International Search Report issued for International application No. PCT/EP2020/058780—Jul. 20, 2020.
PCT Written Opinion of the International Searching Authority issued for International application No. PCT/EP2020/058780—Jul. 20, 2020.

* cited by examiner

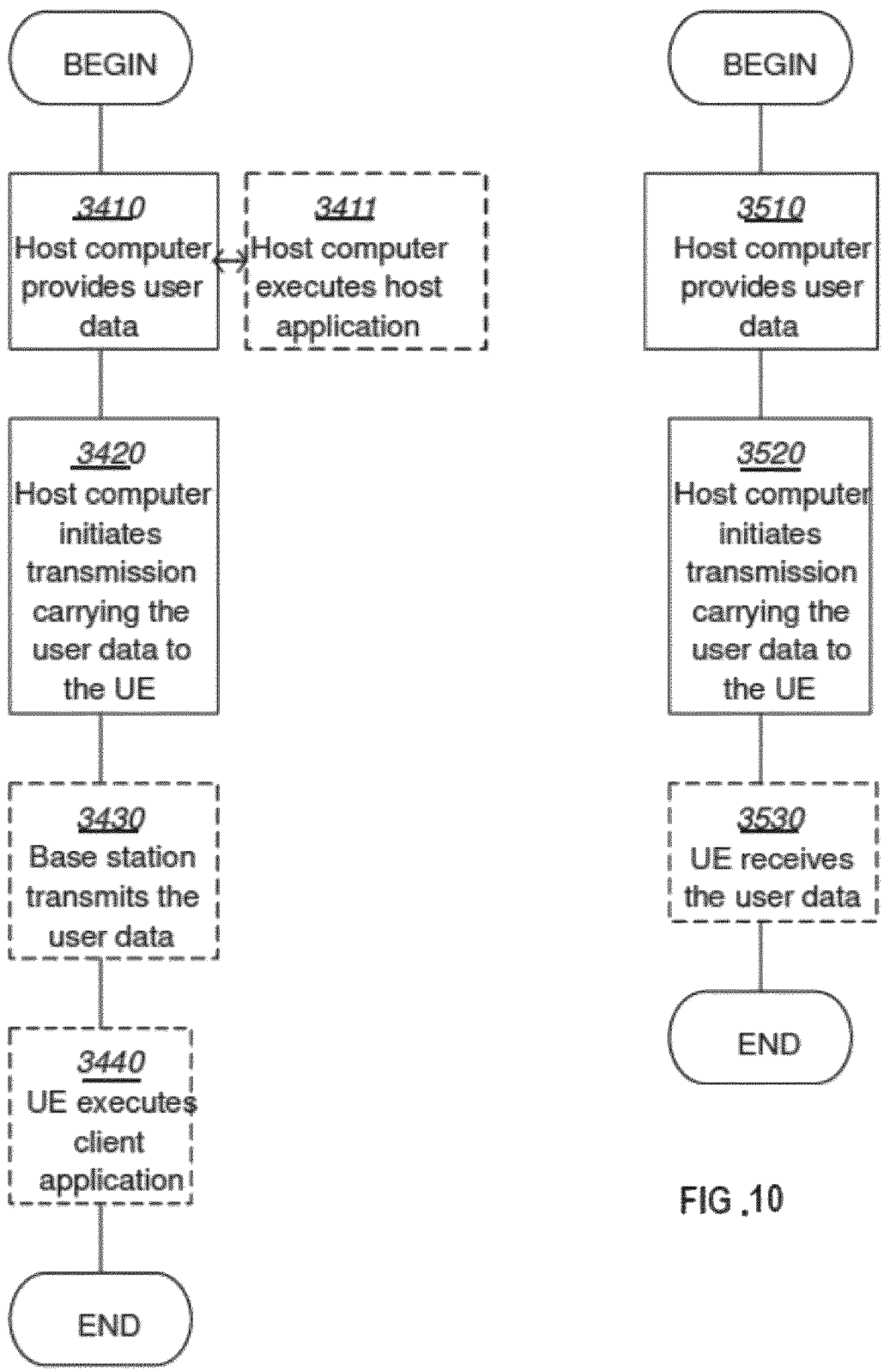

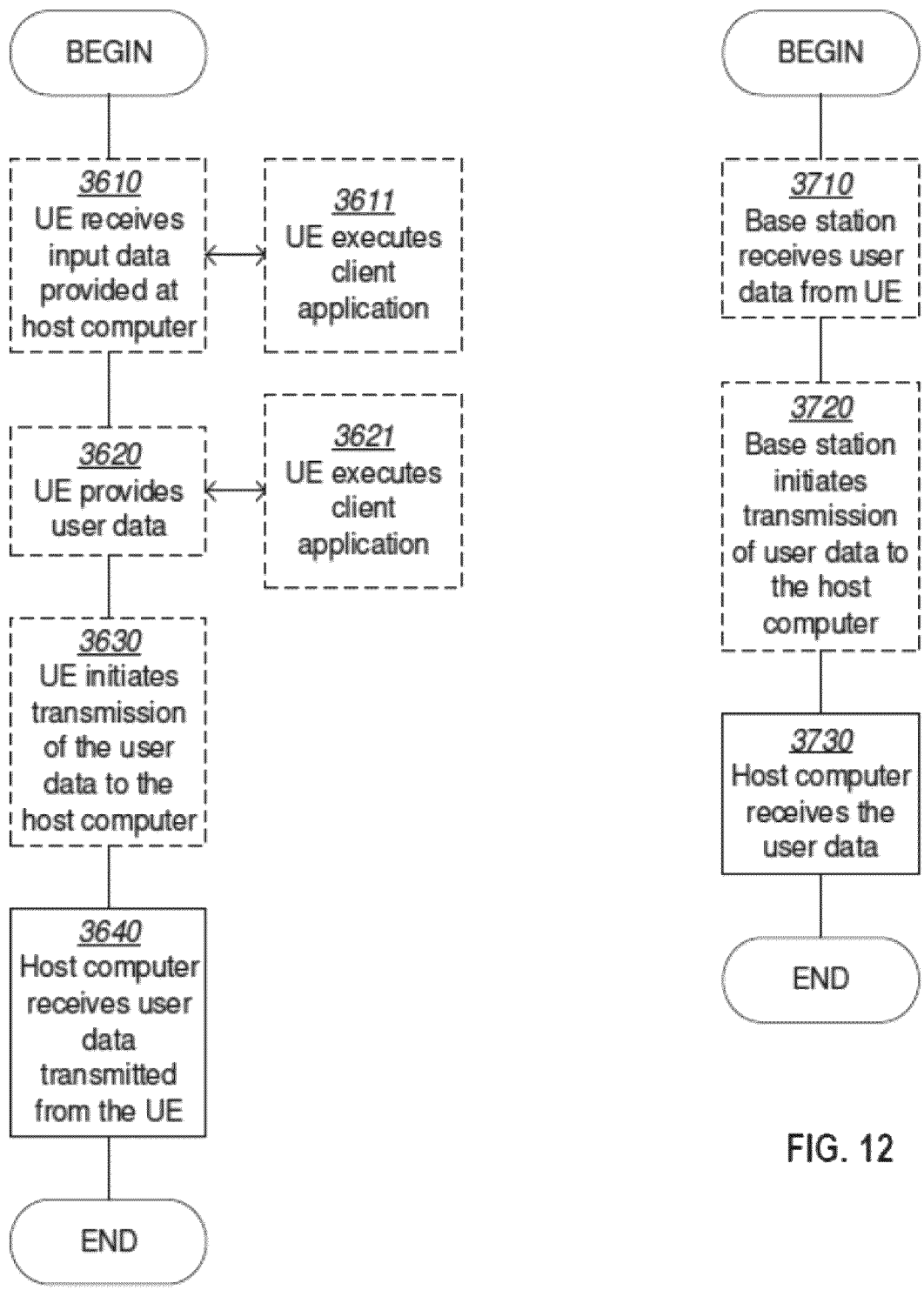

METHODS AND DEVICES FOR MANAGING TRANSMISSIONS IN A WIRELESS COMMUNICATIONS NETWORK

PRIORITY

This nonprovisional application is a U.S. National Stage Filing under 35 U.S.C. § 371 of International Patent Application Serial No. PCT/EP2020/058780 filed Mar. 27, 2020 and entitled "UE, RADIO NETWORK NODE AND METHODS PERFORMED THEREIN" which claims priority to U.S. Provisional Patent Application No. 62/825,901 filed Mar. 29, 2019 both of which are hereby incorporated by reference in their entirety.

TECHNICAL FIELD

Embodiments herein relate to a user equipment (UE), a radio network node and methods performed therein regarding wireless communication. In particular, embodiments herein relate to handling communication, such as handling, controlling and/or managing transmissions, in a wireless communications network.

BACKGROUND

In a typical wireless communications network, user equipment (UE), also known as wireless communication devices, mobile stations, stations (STA) and/or wireless devices, communicate via a Radio Access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

There has been a lot of work in 3GPP on specifying technologies to cover Machine-to-Machine (M2M) and/or Internet of Things (IoT) related use cases. Most recent work for 3GPP Release 13, 14 and 15 includes enhancements to support Machine-Type Communications (MTC) with new UE categories denoted as Cat-M1 and Cat-M2, supporting reduced bandwidth of up to 6 and 24 physical resource blocks (PRBs), and Narrowband IoT (NB-IoT) UEs providing a new radio interface, and UE categories Cat-NB1 and Cat-NB2.

We will refer to the LTE enhancements introduced in 3GPP Release 13, 14, and 15 for MTC as "eMTC", including (not limiting) support for bandwidth limited UEs, Cat-M1, and support for coverage enhancements. This is to separate discussions from NB-IoT (notation here used for any Release), although the supported features are similar on a general level.

For both eMTC and NB-IoT, 'CIoT EPS UP optimization' and 'CIoT EPS CP optimization' signaling reductions were also introduced in Rel-13. The former, here referred to as user plane (UP)-solution, allows the UE to resume a previously stored radi resource control (RRC) connection (thus also known as RRC Suspend/Resume). The latter, here referred to as control plane (CP)-solution, allows the transmission of user-plane data over non access stratum (NAS) (aka DoNAS).

There are multiple differences between "legacy" LTE and the procedures and channels defined for eMTC and for NB-IoT. Some important differences include a new physical channel, such as the physical downlink control channels, called MPDCCH in eMTC and NPDCCH in NB-IoT, and a new physical random access channel, NPRACH, for NB-IoT. Another important difference is the coverage level (also known as coverage enhancement level) that these technologies can support. By applying repetitions to the transmitted signals and channels, both eMTC and NB-IoT allow UE operation down to much lower signal to noise ratio (SNR) level compared to LTE, i.e. $Es/Iot \geq -15$ dB being the lowest operating point for eMTC and NB-IoT which can be compared to $-6$ dB Es/IoT for "legacy" LTE.

The Rel-16 Work Item Descriptions for LTE-M and NB-IoT contain a common objective on improving the uplink transmission efficiency and/or UE power consumption by means of transmission in preconfigured resources. For improved UL transmission efficiency and/or UE power consumption, support for transmission may be specified in preconfigured uplink resources (PUR) in idle and/or connected mode based on single-carrier frequency-division multiple access (SC-FDMA) waveform for UEs with a valid timing advance. Both shared resources and dedicated resources can be supported, however, this may be limited to orthogonal (multi) access schemes.

Regarding the use of HARQ and acknowledgements, 3GPP has agreed that: for dedicated PUR in idle mode, upon successful decoding by eNB of a PUR transmission, the UE can expect an explicit acknowledgement (ACK); FFS: if ACK is sent on MPDCCH (layer 1) and/or PDSCH (layer 2/3); and to include in LS. Further, for LTE, for a dedicated PUR in idle mode, upon unsuccessful decoding by eNB of a PUR transmission, the UE can expect: an UL GRANT for retransmission on the MPDCCH; FFS a NACK; or FFS no explicit ACK; and include in LS. Further, for dedicated PUR in idle mode, the dedicated PUR ACK is at least sent on (M/N)PDCCH. For FSS, whether to introduce new field in DCI or reuse existing field [NB-IoT only] and it ca be decided if a higher layer PUR ACK is also supported.

The eNB can (re)configure and release D-PUR by dedicated RRC signaling, dedicated preconfigured uplink resources (D-PUR) may be referred to as D-PUR. D-PUR in RRC Idle mode is supported and both with periodic configurations and configuration for one D-PUR transmission only a.k.a. 'one-shot D-PUR'.

SUMMARY

Some embodiments are directed to methods of operating a network node in a communication network. Operations according to such methods include receiving a transmission that is sent by a user equipment, UE, and that is received over a preconfigured uplink resource, PUR and selecting one or more transmission types for indicating feedback corresponding to the received transmission conditioned to having been successfully received.

Some embodiments include transmitting the feedback corresponding to the received transmission based on the selected response type. In some embodiments, selecting the one or more transmission types includes selecting a first response type using only a physical downlink control channel. Some embodiments provide that the physical downlink control channel includes a layer 1 feedback transmission. In some embodiments, the layer 1 feedback transmission includes an L1 ACK indication.

Some embodiments include determining that a PUR reconfiguration is needed. In some embodiments, selecting the one or more response types includes selecting a second response type for indicating feedback that uses a physical downlink control channel followed by physical downlink shared channel. Some embodiments provide that the physical downlink control channel that is followed by a physical downlink shared channel comprises a layer 2 and/or a layer 3 feedback information. In some embodiments, the layer 2 and/or layer 3 feedback information includes an L2/L3 ACK indication. In some embodiments, the layer 2 and/or layer 3 feedback information includes downlink data information. Some embodiments provide that the layer 2 and/or layer 3 feedback information includes re-configuration information. In some embodiments, selecting one or more response types includes selecting one or more of L1 ACK and L2/L3 ACK.

In some embodiments, transmitting the feedback includes using a physical downlink control channel corresponding to a layer 1 feedback transmission.

In some embodiments, transmitting the feedback includes using a physical downlink control channel followed by a physical downlink shared channel corresponding to a layer 2/3 feedback transmission.

Some embodiments provide that transmitting the feedback includes using a physical downlink control channel corresponding to a layer 1 feedback transmission and a physical downlink control channel followed by a physical downlink shared channel corresponding to a layer 2/3 feedback transmission.

In some embodiments, the transmissions using pre-configured uplink resources are initially configured to use only a layer 1 feedback transmission or only a layer 2/3 feedback transmission. In some embodiments, the network node uses only a layer 1 feedback transmission or only a layer 2/3 feedback transmission based on an indication received by the UE, and/or information available at the network node or any other source of information.

Some embodiments provide that a PUR response message is transmitted responsive to the network node needing to deliver, to the UE, events including DL data, an indication to move the UE to RRC-Connected, data transmission to confirm that data was received by the intended entity, a carrier redirection, providing a new security parameter, a PUR reconfiguration, and/or a PUR configuration release. In some embodiments, the network node does not have a need to transmit a PUR response message and an L1 ACK is transmitted without a L2/L3 ACK.

Some embodiments are directed to a network node operating in a communication network. The network node includes a processing circuit and a memory coupled to the processing circuitry and having instructions stored therein that are executable by the processing circuit to cause the network node to perform operations. Operations include receiving a transmission that is sent by a user equipment, UE, and that is received over a preconfigured uplink resource, PUR and selecting one or more response types for indicating feedback corresponding to the received transmission conditioned to having been successfully received.

Some embodiments are directed to a computer program that includes program code to be executed by processing circuitry of a network node operating in a communication network. Execution of the program code causes the network node to perform operations of receiving a transmission that is sent by a user equipment, UE, and that is received over a preconfigured uplink resource, PUR and selecting one or more response types for indicating feedback corresponding to the received transmission conditioned to having been successfully received.

Some embodiments are directed to methods of operating a wireless device in a communications network. Methods include transmitting, using a preconfigured uplink resource, PUR, data to a network node in the wireless communication network and receiving feedback that includes at least one of multiple transmission types.

In some embodiments, the at least one of the multiple response types is performed using only a physical downlink control channel. In some embodiments, the at least one response type corresponds to a layer 1 feedback transmission. Some embodiments provide that the layer 1 feedback transmission includes an L1 ACK indication.

In some embodiments, responsive to determining that a PUR reconfiguration is needed, the at least one transmission type includes a second response type for indicating feedback that uses a physical downlink control channel followed by a physical downlink shared channel. In some embodiments, the physical downlink control channel that is followed by a physical downlink shared channel includes a layer 2 and/or a layer 3 feedback information.

In some embodiments, the layer 2 and/or layer 3 feedback information includes an L2/L3 ACK indication and/or downlink data and/or re-configuration information.

Some embodiments provide that the feedback transmission uses a physical downlink control channel corresponding to a layer 1 feedback transmission and a physical downlink control channel followed by physical downlink shared channel corresponding to a layer 2/3 feedback transmission.

Some embodiments are directed to a wireless device operating in a communication network. The wireless device includes a processing circuit and a memory coupled to the processing circuitry and having instructions stored therein that are executable by the processing circuit to cause the network node to perform operations. Operations include transmitting, using a preconfigured uplink resource, PUR, data to a network node in the wireless communication network and receiving feedback that includes at least one of a plurality of response types.

Some embodiments are directed to a computer program that includes program code to be executed by processing circuitry of a network node operating in a communication network. Execution of the program code causes the network node to perform operations of transmitting, using a preconfigured uplink resource, PUR, data to a network node in the wireless communication network and receiving feedback that includes at least one of a plurality of response types.

BRIEF DESCRIPTION OF THE DRAWINGS

Embodiments will now be described in more detail in relation to the enclosed drawings.

FIG. 9 is a flowchart illustrating operations corresponding to methods implemented in a communication system including a host computer, a base station and a user equipment in accordance with some embodiments.

FIG. 10 is a flowchart illustrating operations corresponding to methods implemented in a communication system including a host computer, a base station and a user equipment in accordance with some embodiments.

FIG. 11 is a flowchart illustrating operations corresponding to methods implemented in a communication system including a host computer, a base station and a user equipment in accordance with some embodiments.

FIG. 12 is a flowchart illustrating operations corresponding to methods implemented in a communication system including a host computer, a base station and a user equipment in accordance with some embodiments.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps or operations of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
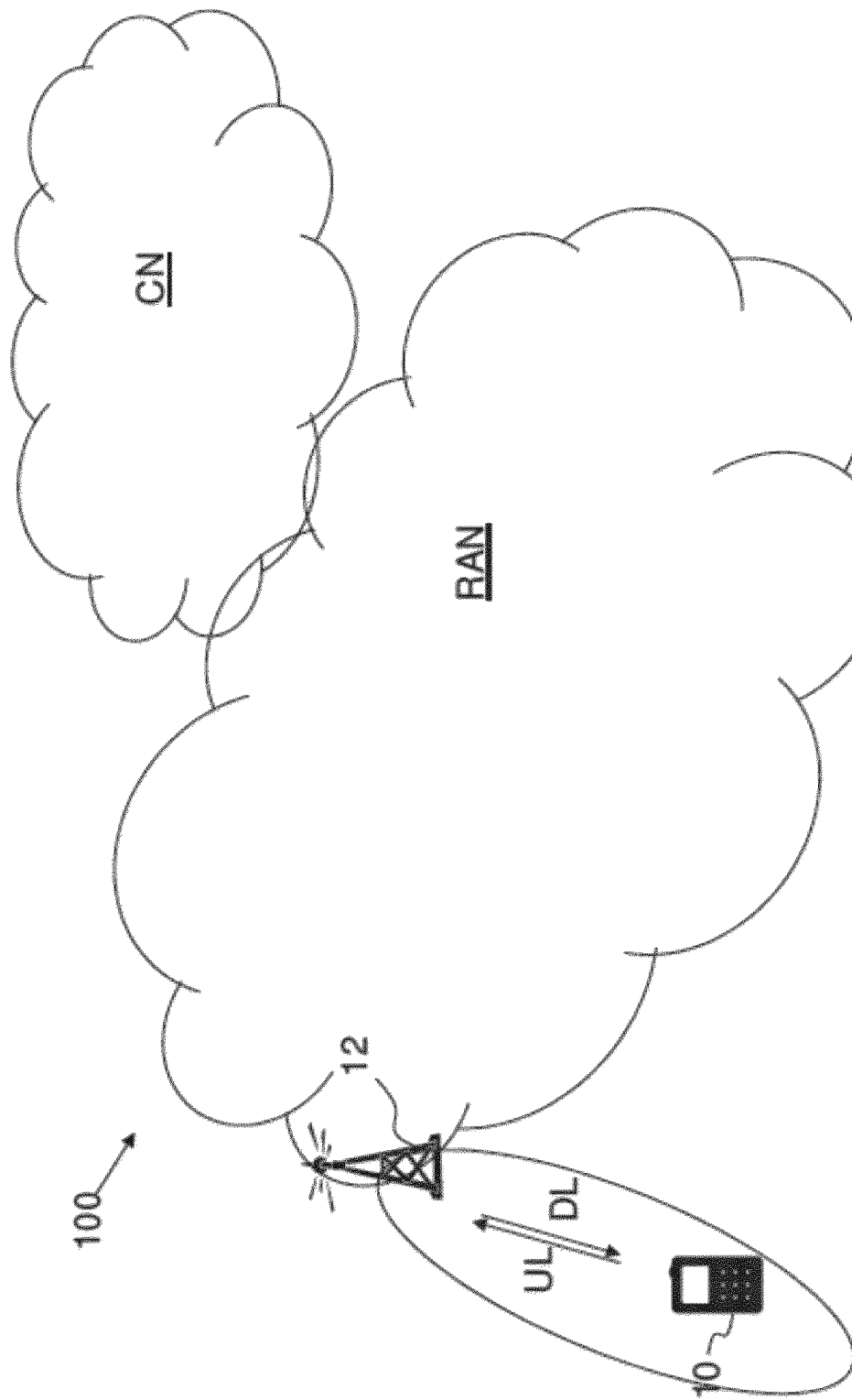
FIG. 1 is a schematic overview depicting a wireless communications network according to embodiments herein.

Embodiments herein relate to wireless communications networks in general. FIG. 1 is a schematic overview depicting a wireless communications network 100. The wireless communications network 100 comprises one or more RANs and one or more CNs. The wireless communications network 100 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 100, a user equipment (UE) 10 exemplified herein as a wireless device such as a mobile station, a non-access point (non-AP) station (STA), a STA and/or a wireless terminal, is comprised communicating via e.g. one or more Access Networks (AN), e.g. radio access network (RAN), to one or more core networks (CN). It should be understood by the skilled in the art that "UE" is a non-limiting term which means any terminal, wireless communications terminal, user equipment, narrowband internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 100 comprises a radio network node 12 providing radio coverage over a geographical area, a first service area, of a first radio access technology (RAT), such as NR, LTE, or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on the first radio access technology and terminology used. The radio network node may be referred to as a serving radio network node wherein the service area may be referred to as a serving cell, and the serving network node communicates with the wireless device in form of DL transmissions to the wireless device and UL transmissions from the wireless device. It should be noted that a service area may be denoted as cell, beam, beam group or similar to define an area of radio coverage.

The radio network node 12 may configure the UE 10 to perform methods disclosed herein for handling transmissions of the wireless communication network 100 for e.g. MTC or NB-IoT communications.

Figure 2:
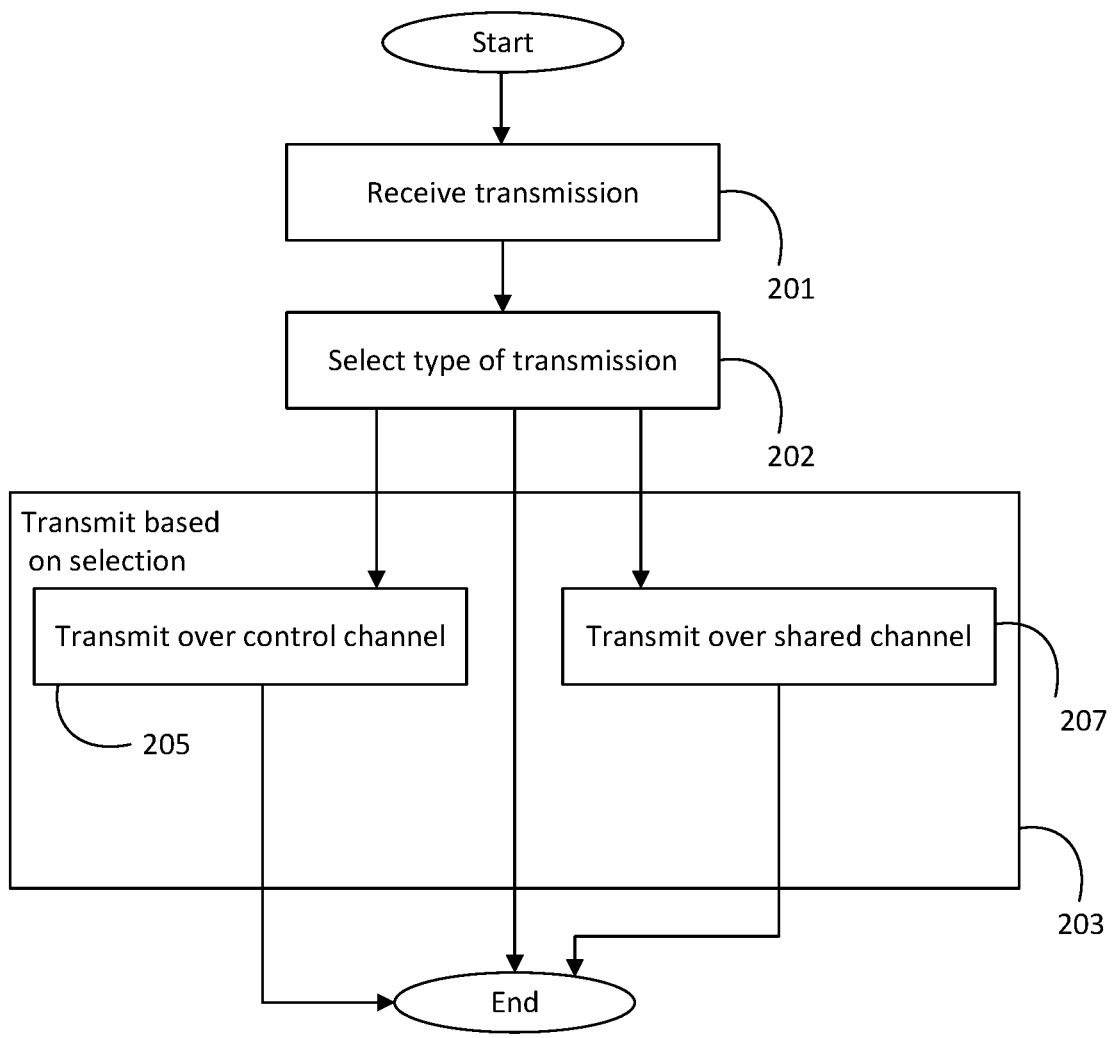
FIG. 2 is a schematic flowchart depicting a method performed by a radio network node according to embodiments herein.

The method actions performed by the radio network node 12 for handling communication e.g. handling transmissions, in a wireless communication network according to embodiments will now be described with reference to a flowchart depicted in FIG. 2. The actions do not have to be taken in the order stated below, but may be taken in any suitable order. Actions performed in some embodiments are marked with dashed boxes.

In some embodiments, the radio network node 12 may receive a transmission from the UE 10. E.g. the radio network node 12 may receive a transmission over PURs from the UE 10.

In some embodiments, the radio network node 12 selects one or more types of transmission for indicating feedback of the received transmission from the UE 10 when a condition is fulfilled. E.g. the radio network node 12 may select a first type of transmission using a control channel, a so-called layer 1 feedback transmission also referred to as L1 ACK procedure. The radio network node 12 may further select e.g. in case PUR reconfiguration is needed, a second type of transmission for indicating feedback wherein the feedback is transmitted using a shared channel such as a PUR response, a so called layer 2 and/or layer 3 feedback transmission also referred to as L2/L3 ACK procedure. It should here be noted that the radio network node 12 may use both types of transmissions or one type of transmission.

In some embodiments, the radio network node 12 may transmit feedback of the received transmission as selected. The radio network node 12 may thus transmit e.g. feedback such as ACK using the control channel, a so-called layer 1 feedback transmission also referred to as L1 ACK procedure. The radio network node 12 may alternatively or additionally, transmit e.g. in case PUR reconfiguration is needed, feedback wherein the feedback is transmitted using a shared channel such as a PUR response, a so called layer 2 and/or layer 3 feedback transmission also referred to as L2/L3 ACK procedure. It should here be noted that the radio network node 12 may use both types of transmissions or one type of transmission.

Embodiments herein introduce a hybrid solution for transmission in Preconfigured Uplink Resources (PUR), L1 feedback may be used more often and L2/L3 feedback may be used e.g. in case PUR re-configuration is required.

Figure 3:
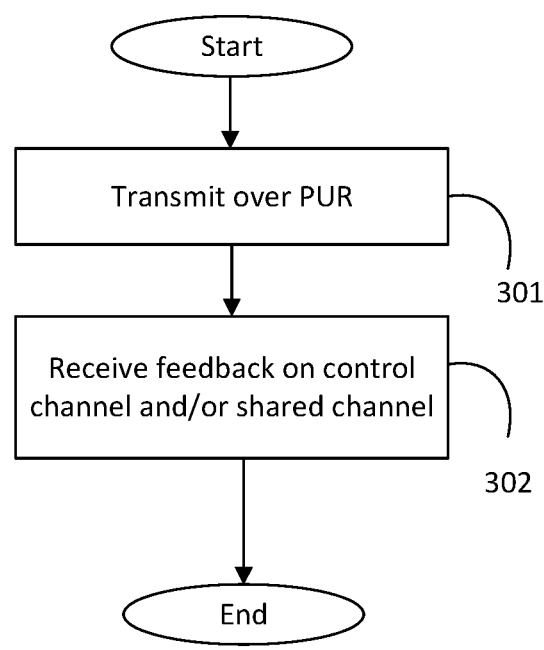
FIG. 3 is a schematic flowchart depicting a method performed by a UE according to embodiments herein.

Some embodiments include methods, performed by the UE 10 for handling communication e.g. handling transmissions and/or retransmissions of data, in a wireless communication network in e.g. an unlicensed operation, see FIG. 3. The UE 10 operates in the wireless communications network 100. The methods may comprise the following operations. Some embodiments provide that operations provide that the UE 10 transmits data or similar over PUR to the radio network node 12. Operations may further provide that the UE 10 further receives feedback of the transmitted transmission as selected by the radio network node 12. The UE 10 may thus receive e.g. feedback such as ACK using the control channel, a so-called layer 1 feedback transmission also referred to as L1 ACK procedure. The UE 10 may alternatively or additionally, receive e.g. in case PUR reconfiguration is needed, feedback wherein the feedback is received over a shared channel such as a PUR response, a so-called layer 2 and/or layer 3 feedback transmission also referred to as L2/L3 ACK procedure.

Figure 4A:
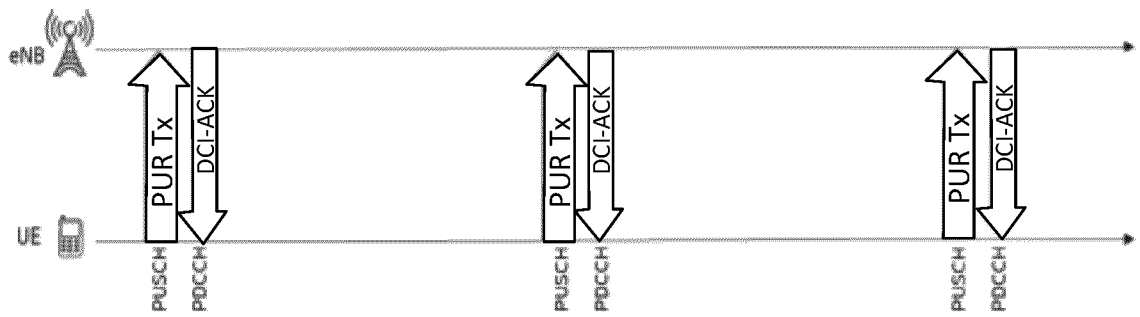
FIGS. 4a-4c show feedback procedures according to embodiments herein.
Figure 4B:
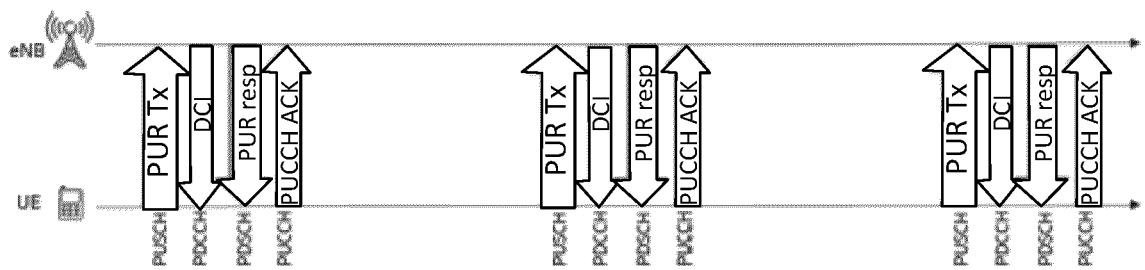

In some embodiments, the L1 ACK signaling as illustrated in FIG. 4a, provides that the feedback is transmitted over the control channel. As illustrated in FIG. 4b, the L2/L3 ACK signalling provides that the feedback is transmitted over the shared channel.

Figure 4C:
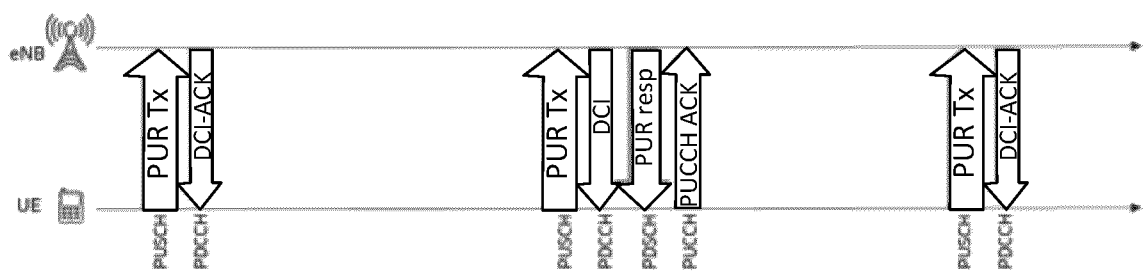

The radio network node 12 transmits only L1 ACK, i.e. no higher layer or L2/L3 ACK to minimize the signaling when there is no need for e.g., PUR reconfiguration etc., and transmit L2/L3 ACK and a potential 'PUR response' e.g. data, in the downlink otherwise. This is illustrated schematically in FIG. 4c.

In two different alternatives, the L1 ACK (DCI-ACK in the FIGS. 4a-4c) could either be omitted when there is a downlink 'PUR response' and a L2/L3 ACK (as in FIGS. 4b and 4c), or be transmitted in addition to L2/L3 ACK, i.e. L1 ACK before L2/L3 ACK, and/or 'PUR response'. In the latter alternative, the L1 could be considered redundant in some embodiments, but still there would be the benefit of the hybrid solution by using only L1 ACK in some cases (optionally, to avoid the L1 ACK to be redundant it can be muted which may be used to indicate the presence of an upcoming L2/L3 ACK). In some embodiments the L1 ACK can be beneficial and could be used by the UE to stop UL repetitions early (cf. Rel-15 HARQ feedback) or to trigger UE to sleep, i.e. no need to monitor for reception of L2/L3 ACK or 'PUR response'.

Only L1 ACK would be transmitted as default whenever there is no need for a downlink 'PUR response' message. The 'PUR response' message would be transmitted e.g. where there is a need for any of the following: transmission of DL data; m move UE to RRC CONNECTED; reliable data transmission for the UE to know that data was received by the intended entity; carrier redirection'; providing a new NCC (security parameter); PUR re-configuration; and/or PUR configuration release.

In some embodiments, 1) via an indication from UE 10, 2) information available to the radio network node 12, or any other means, PUR is configured as a reliable transmission service (L2/L3 ACK and 'PUR response') or as an unreliable service (L1 ACK only). The indication to radio network node 12 could either come from the UE 10 (UE preference) or from the CN e.g. based on subscription information of the UE 10. (Reliability here refers to the bullet above and the UE confirmation that the data has been received by the intended eNB).

In some embodiments the hybrid ACK scheme offers flexibility to the network to transmit the L2/L3 ACK on-demand.

In some embodiments, the hybrid ACK scheme allows the network passing from using a hybrid ACK scheme (i.e., where both L1 ACK and L2/L3 ACK are used) to use only a L2/L3 ACK scheme (i.e., network can decide not using the L1 ACK at all by signaling persistently a L2/L3 ACK).

Some embodiments provide that the hybrid ACK scheme allows the network passing from using a hybrid ACK scheme (i.e., where both L1 ACK and L2/L3 ACK are used) to use only a L1 ACK scheme (i.e., network can decide not using the L2/L3 ACK at all by signaling persistently a L1 ACK).

In some embodiments, when the hybrid ACK scheme is in use, and the L1 ACK is not omitted when the L2/L3 ACK is going to be present, the L1 ACK can be muted which may be used to indicate the presence of an upcoming L2/L3 ACK.

A bit combination in a field carried by (M/N)PDCCH can be used to indicate whether the L1-ACK is effective or muted.

In some embodiments, when the hybrid ACK scheme is in use, and the L1 ACK is not omitted when the L2/L3 ACK is going to be present, the L1 ACK is carried solely in the (M/N)PDCCH.

In some embodiments, when the hybrid ACK scheme is in use, and the L1 ACK is not omitted when the L2/L3 ACK is going to be present, the L1 ACK is carried in the (M/N)PDCCH along with other L1 parameters, e.g., Timing Advance update, Power Control, Resource allocation in time and frequency, etc.

Figure 5:
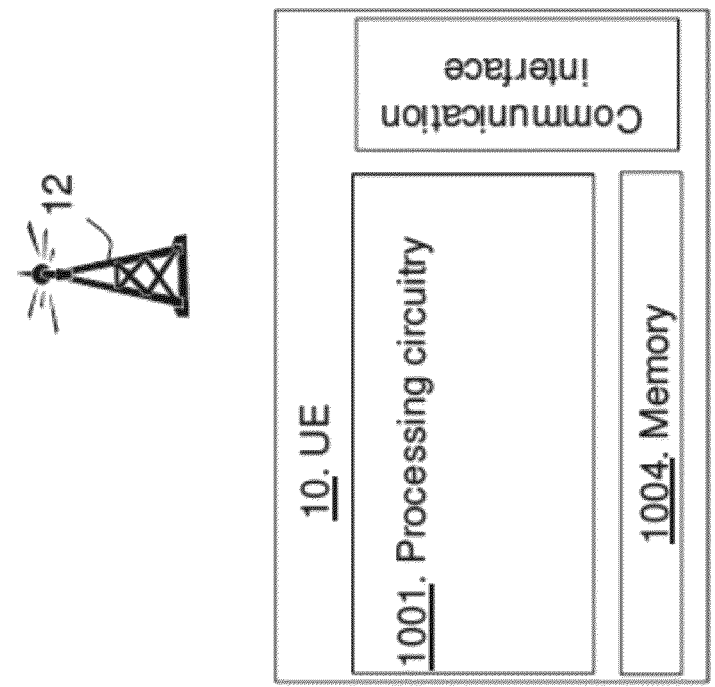
FIG. 5 is a block diagram depicting a UE according to embodiments herein.
Figure 5:
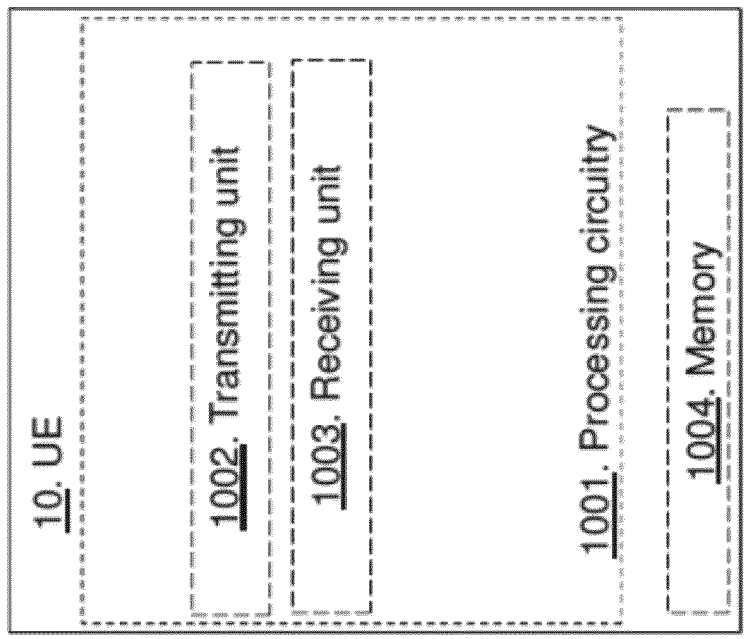
Figure 5:
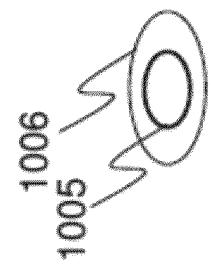

Reference is now made to FIG. 5, which is a block diagram depicting the UE for handling communication in a wireless communication network 100 according to embodiments herein.

In some embodiments, the UE 10 may include processing circuitry 1001, e.g. one or more processors, configured to perform the methods herein.

The UE 10 may include a transmitting unit 1002, e.g. a transmitter, a transceiver and/or similar. The UE 10, the processing circuitry 1001, and/or the transmitting unit 1002 is configured to transmit data or similar over PUR to the radio network node 12.

The UE 10 may include a receiving unit 1003, e.g. a receiver, a transceiver or similar. The UE 10, the processing circuitry 1001, and/or the receiving unit 1003 may be configured to receive feedback of the transmitted transmission as selected by the radio network node 12 when the condition is fulfilled. The UE 10, the processing circuitry 1001, and/or the receiving unit 1003 may thus be configured to receive e.g. feedback such as ACK using the control channel, a so-called layer 1 feedback transmission also referred to as L1 ACK procedure. The UE 10, the processing circuitry 1001, and/or the receiving unit 1003 may alternatively or additionally be configured to receive e.g. in case PUR reconfiguration is needed, feedback wherein the feedback is received over the shared channel such as a PUR response, a so-called layer 2 and/or layer 3 feedback transmission also referred to as L2/L3 ACK procedure.

The UE 10 further includes a memory 1004. The memory 1004 includes one or more units to be used to store data on, such as ACK/NACK, feedback, UL data, PUR and applications to perform the methods disclosed herein when being executed, and similar. Furthermore, the UE 10 may include a communication interface such as comprising a transmitter, a receiver and/or a transceiver and one or more antennas.

The methods according to the embodiments described herein for the UE 10 are respectively implemented by means of e.g. a computer program product 1005 or a computer program, comprising instructions, i.e., software code portions, which, when executed on at least one processor, cause the at least one processor to carry out the actions described herein, as performed by the UE 10. The computer program product 1005 may be stored on a computer-readable storage medium 1006, e.g. a disc, a universal serial bus (USB) stick or similar. The computer-readable storage medium 1006, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, embodiments herein may disclose a UE for handling communication in a wireless communications network, wherein the UE comprises processing circuitry and a memory, said memory comprising instructions executable by said processing circuitry whereby said UE is operative to perform any of the methods herein.

Figure 6:
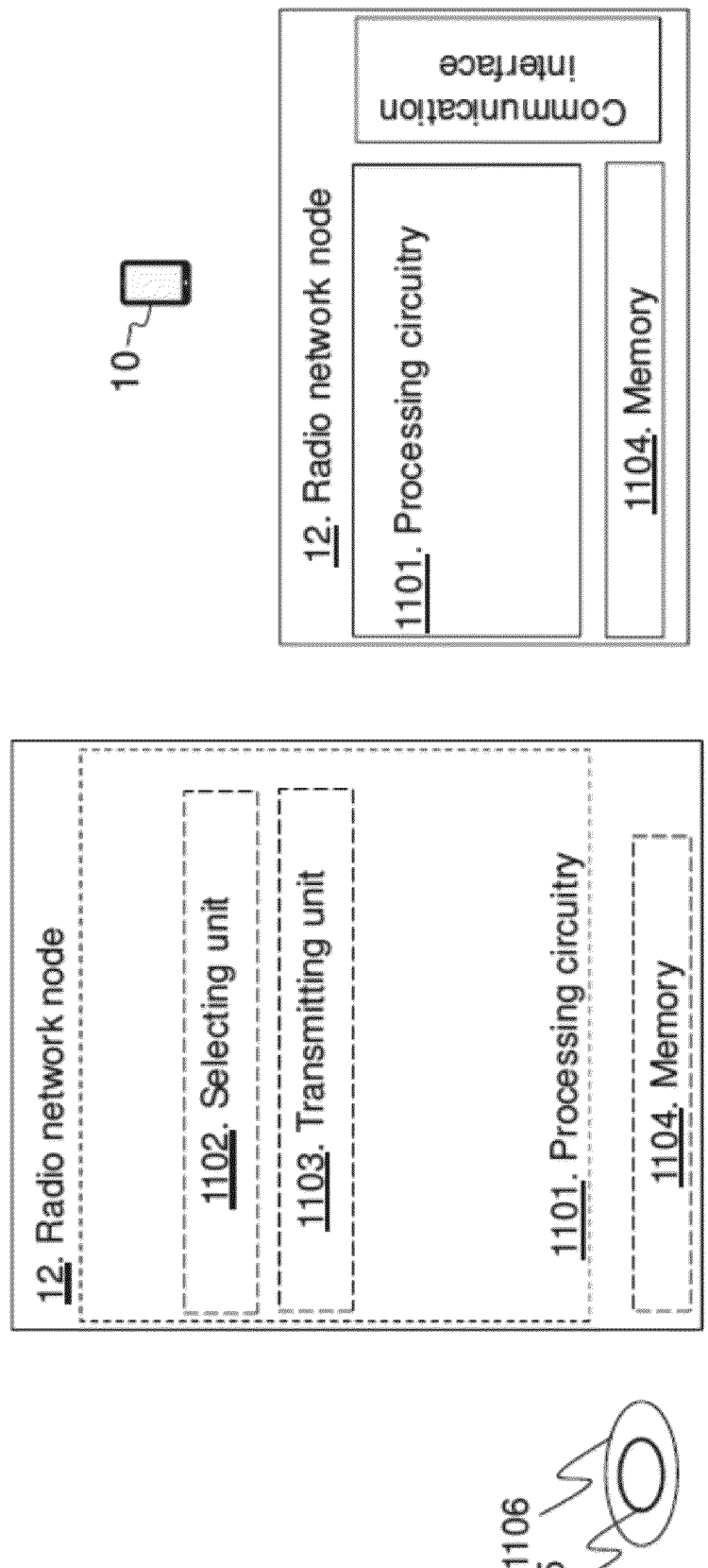
FIG. 6 is a block diagram depicting a radio network node according to embodiments herein.

Reference is now made to FIG. 6, which is a block diagram depicting the radio network node 12 for handling data packets or handling communication in a wireless communications network 1 according to embodiments herein.

The radio network node 12 may include processing circuitry 1101, e.g. one or more processors, configured to perform the methods herein.

The radio network node 12 may include a selecting unit 1102. The radio network node 12, the processing circuitry 1101, and/or the selecting unit 1102 is configured to select one or more types of transmission for indicating feedback of the received transmission from the UE 10 when the condition is fulfilled. E.g. the radio network node 12, the processing circuitry 1101, and/or the selecting unit 1102 may be configured to select the first type of transmission using the control channel, a so-called layer 1 feedback transmission also referred to as L1 ACK procedure. The radio network node 12, the processing circuitry 1101, and/or the selecting unit 1102 may further be configured to select e.g. in case PUR reconfiguration is needed, the second type of transmission for indicating feedback wherein the feedback is transmitted using the shared channel such as a PUR response, a so called layer 2 and/or layer 3 feedback transmission also referred to as L2/L3 ACK procedure. It should here be noted that the radio network node 12, the processing circuitry 1101, and/or the selecting unit 1102 may be configured to use both types of transmissions or one type of transmission.

The radio network node 12 may comprise a transmitting unit 1103, e.g. a transmitter, a transceiver and/or similar. The radio network node 12, the processing circuitry 1101, and/or the transmitting unit 1103 may be configured to transmit feedback of the received transmission (as selected) when the condition is fulfilled. The radio network node 12, the processing circuitry 1101, and/or the transmitting unit 1103 may be configured to transmit e.g. feedback such as ACK using the control channel, a so-called layer 1 feedback transmission also referred to as L1 ACK procedure. The radio network node 12, the processing circuitry 1101, and/or the transmitting unit 1103 may alternatively or additionally, be configured to transmit e.g. in case PUR reconfiguration is needed, feedback wherein the feedback is transmitted using the shared channel such as a PUR response, a so-called layer 2 and/or layer 3 feedback transmission also referred to as L2/L3 ACK procedure.

The radio network node 12 further includes a memory 1104. The memory 1104 includes one or more units to be used to store data on, such as data packets, feedbacks, PUR configurations, events to determine when to transmits a certain type of transmission, and applications to perform the methods disclosed herein when being executed, and similar. Furthermore, the radio network node 12 may include a communication interface such as comprising a transmitter, a receiver and/or a transceiver.

The methods according to the embodiments described herein for the radio network node 12 are respectively implemented by means of e.g. a computer program product 1105 or a computer program, comprising instructions, i.e., software code portions, which, when executed on at least one processor, cause the at least one processor to carry out the actions described herein, as performed by the radio network node 12. The computer program product 1105 may be stored on a computer-readable storage medium 1106, e.g. a disc, a universal serial bus (USB) stick or similar. The computer-readable storage medium 1106, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium. Thus, embodiments herein may disclose a radio network node for handling communication in a wireless communications network, wherein the radio network node includes processing circuitry and a memory, said memory including instructions executable by said processing circuitry whereby said radio network node is operative to perform any of the methods herein.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

In some embodiments, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Figure 7:
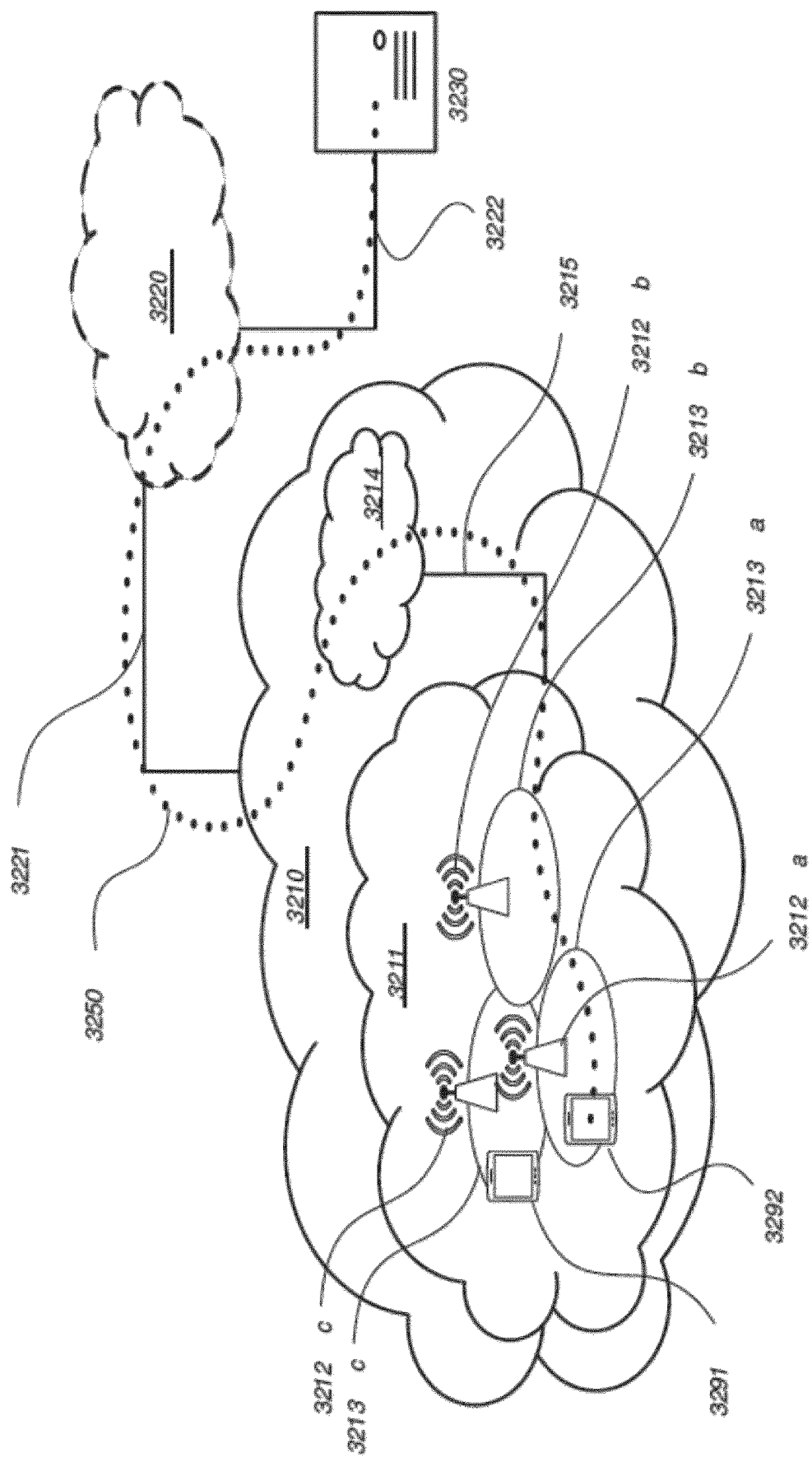
FIG. 7 is a telecommunication network connected via an intermediate network to a host computer in accordance with some embodiments.

Reference is now made to FIG. 7, which shows a Telecommunication network connected via an intermediate network to a host computer in accordance with some embodiments. With reference to FIG. 7, in accordance with some embodiments, a communication system includes telecommunication network 3210, such as a 3GPP-type cellular network, which includes access network 3211, such as a radio access network, and core network 3214. Access network 3211 includes a plurality of base stations 3212a, 3212b, 3212c, such as NBs, eNBs, gNBs or other types of wireless access points being examples of the radio network node 12 above, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example being examples of the UE 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 7 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 8:
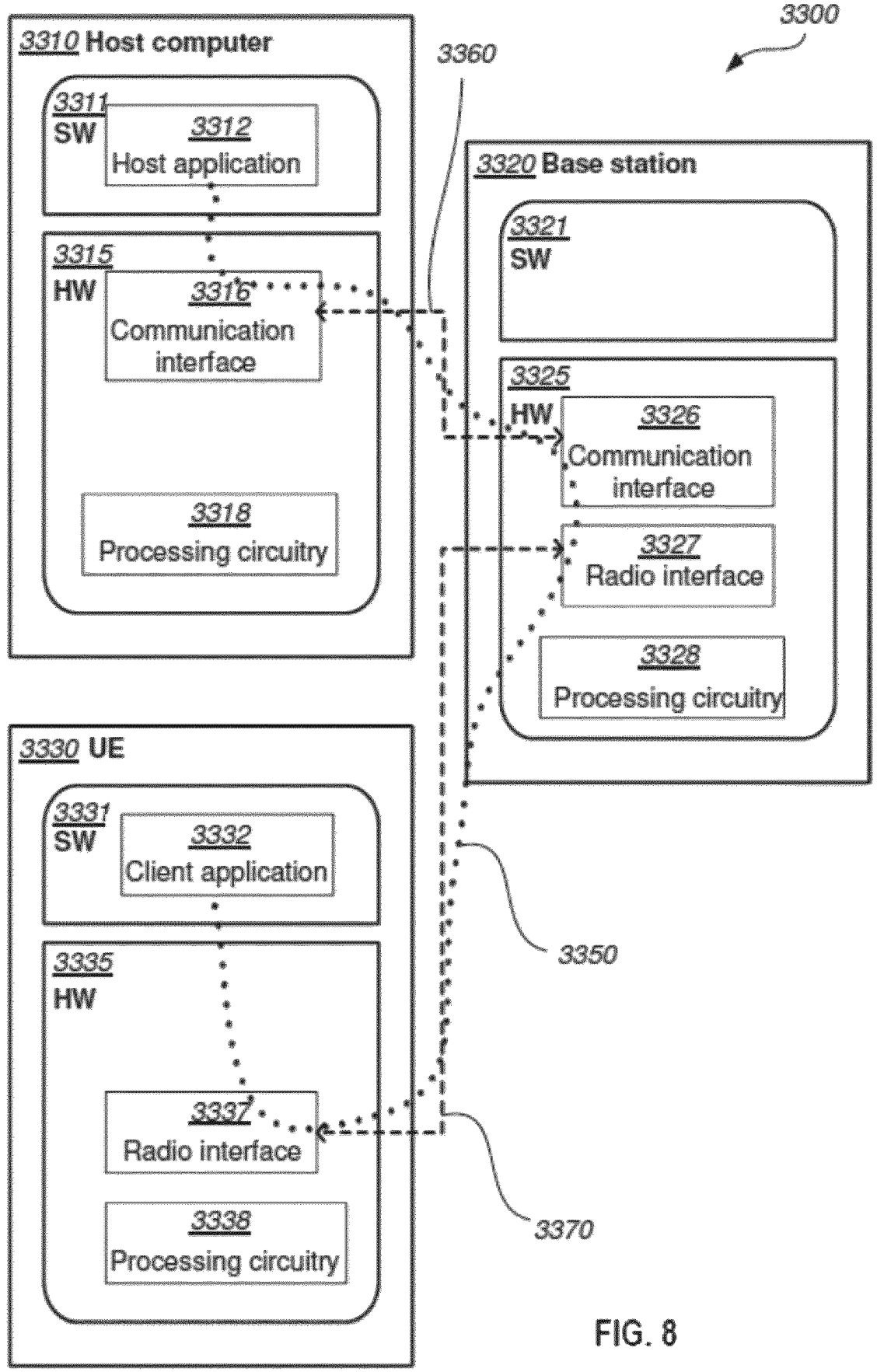
FIG. 8 is a host computer communicating via a base station with a user equipment over a partially wireless connection in accordance with some embodiments.

Reference is now made to FIG. 8, which shows a host computer communicating via a base station and with a user equipment over a partially wireless connection in accordance with some embodiments.

Example implementations, in accordance with some embodiments of the UE, base station and host computer discussed in the preceding paragraphs will now be described with reference to FIG. 8. In communication system 3300, host computer 3310 includes hardware 3315 including communication interface 3316 configured to set up and maintain a wired or wireless connection with an interface of a different communication device of communication system 3300. Host computer 3310 further includes processing circuitry 3318, which may have storage and/or processing capabilities. In particular, processing circuitry 3318 may include one or more programmable processors, application-specific integrated circuits, field programmable gate arrays or combinations of these (not shown) adapted to execute instructions. Host computer 3310 further includes software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 8) served by base station 3320. Communication interface 3326 may be configured to facilitate connection 3360 to host computer 3310. Connection 3360 may be direct or it may pass through a core network (not shown in FIG. 8) of the telecommunication system and/or through one or more intermediate networks outside the telecommunication system. In the embodiment shown, hardware 3325 of base station 3320 further includes processing circuitry 3328, which may include one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3333 may include radio interface 3337 configured to set up and maintain wireless connection 3370 with a base station serving a coverage area in which UE 3330 is currently located. Hardware 3333 of UE 3330 further includes processing circuitry 3338, which may include one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 8 may be similar or identical to host computer 3230, one of base stations 3212a, 3212b, 3212c and one of UEs 3291, 3292 of FIG. 7, respectively. This is to say, the inner workings of these entities may be as shown in FIG. 8 and independently, the surrounding network topology may be that of FIG. 7.

In FIG. 8, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments make it possible to enhance the CWS maintenance scheme for PUCCH transmission and/or a better fairness of channel accesses may be achieved. Embodiments herein may e.g. enable the radio network node to more efficiently acknowledge or provide feedback more quickly according to embodiments herein, and resulting in a better responsiveness.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Reference is now made to FIG. 9, which shows methods implemented in a communication system including a host computer, a base station and a user equipment in accordance with some embodiments. Specifically, FIG. 9 is a flowchart illustrating methods implemented in a communication system, in accordance with some embodiments. The communication system includes a host computer, a base station and a UE which may be those described with reference to FIG. 7 and FIG. 8. For simplicity of the present disclosure, only drawing references to FIG. 9 will be included in this section. In operation 3410, the host computer provides user data. In substep 3411 (which may be optional) of operation 3410, the host computer provides the user data by executing a host application. In operation 3420, the host computer initiates a transmission carrying the user data to the UE. In operation 3430 (which may be optional), the base station transmits to the UE the user data which was carried in the transmission that the host computer initiated, in accordance with the teachings of the embodiments described throughout this disclosure. In operation 3440 (which may also be optional), the UE executes a client application associated with the host application executed by the host computer.

Reference is now made to FIG. 10, which shows methods implemented in a communication system including a host computer, a base station and a user equipment in accordance with some embodiments. Specifically, FIG. 10 is a flowchart illustrating methods implemented in a communication system, in accordance with some embodiments. The communication system includes a host computer, a base station and a UE which may be those described with reference to FIG. 7 and FIG. 8. For simplicity of the present disclosure, only drawing references to FIG. 10 will be included in this section. In operation 3510 of the method, the host computer provides user data. In an optional substep (not shown) the host computer provides the user data by executing a host application. In operation 3520, the host computer initiates a transmission carrying the user data to the UE. The transmission may pass via the base station, in accordance with the teachings of the embodiments described throughout this disclosure. In operation 3530 (which may be optional), the UE receives the user data carried in the transmission.

Reference is now made to FIG. 11, which shows methods implemented in a communication system including a host computer, a base station and a user equipment in accordance with some embodiments. Specifically, FIG. 11 is a flowchart illustrating methods implemented in a communication system, in accordance with some embodiments. The communication system includes a host computer, a base station and a UE which may be those described with reference to FIG. 7 and FIG. 8. For simplicity of the present disclosure, only drawing references to FIG. 11 will be included in this section. In operation 3610 (which may be optional), the UE receives input data provided by the host computer. Additionally or alternatively, in operation 3620, the UE provides user data. In substep 3621 (which may be optional) of operation 3620, the UE provides the user data by executing a client application. In substep 3611 (which may be optional) of operation 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In operation 3640 of the method, the host computer receives the user data transmitted from the UE, in accordance with the teachings of the embodiments described throughout this disclosure.

Reference is now made to FIG. 12, which show methods implemented in a communication system including a host computer, a base station and a user equipment in accordance with some embodiments. Specifically, FIG. 12 is a flowchart illustrating a method implemented in a communication system, in accordance with some embodiments. The communication system includes a host computer, a base station and a UE which may be those described with reference to FIG. 7 and FIG. 8. For simplicity of the present disclosure, only drawing references to FIG. 12 will be included in this section. In operation 3710 (which may be optional), in accordance with the teachings of the embodiments described throughout this disclosure, the base station receives user data from the UE. In operation 3720 (which may be optional), the base station initiates transmission of the received user data to the host computer. In operation 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

| Abbreviation | Explanation |
| --- | --- |
| 3GPP | $3^{rd}$ Generation Partnership Project |
| BI | Backoff Indicator |
| BSR | Buffer Status Report |
| Cat-M1 | Category M1 |
| Cat-M2 | Category M2 |
| CE | Coverage Enhanced/Enhancement |
| DL | Downlink |
| D-PUR | Dedicated Preconfigured Uplink Resources |
| eMTC | enhanced Machine-Type Communications |

| Abbreviation | Explanation |
|---|---|
| eNB | Evolved NodeB |
| EDT | Early Data Transmission |
| IoT | Internet of Things |
| LTE | Long-Term Evolution |
| MAC | Medium Access Control |
| NAS | Non-Access Stratum |
| NB-IoT | Narrowband Internet of Things |
| M2M | Machine-to-Machine |
| MTC | Machine-Typ Communications |
| PDU | Protocol Data Unit |
| PUR | Preconfigured Uplink Resources |
| (N)PRACH | (Narrowband) Physical Random Access Channel |
| PRB | Physical Resource Block |
| RA | Random Access |
| RAPID | Random Access Preamble IDentifier |
| RAR | Random Access Response |
| RNTI | Radio Network Temporary Identifier |
| RRC | Radio Resource Control (protocol) |
| TBS | Transport Block Size |
| UE | User Equipment |
| UL | Uplink |
| WI | Work Item |

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method of operating a network node in a communication network, the method comprising:
   receiving a transmission that is sent by a user equipment (UE) and that is received over a preconfigured uplink resource (PUR); and
   selecting one or more transmission types for indicating feedback corresponding to the received transmission conditioned to having been successfully received, wherein selecting one or more transmission types comprises selecting one or more of L1 ACK and L2/L3 ACK.

2. The method of claim 1, further comprising determining that a PUR reconfiguration is needed,
   wherein selecting the one or more transmission types comprises selecting a second transmission type for indicating feedback that uses a physical downlink control channel followed by physical downlink shared channel.

3. The method of claim 2, wherein the physical downlink control channel that is followed by a physical downlink shared channel comprises a layer 2 and/or a layer 3 feedback information.

4. The method of claim 3, wherein the layer 2 and/or layer 3 feedback information comprises an L2/L3 ACK indication.

5. The method of claim 1, wherein transmitting the feedback comprises using a physical downlink control channel corresponding to a layer 1 feedback transmission.

6. A network node operating in a communication network, the network node comprising:
   a processing circuit; and
   a memory coupled to the processing circuitry and having instructions stored therein that are executable by the processing circuit to cause the network node to perform operations, the operations comprising:
   receiving a transmission that is sent by a user equipment (UE) and that is received over a preconfigured uplink resource (PUR); and
   selecting one or more response types for indicating feedback corresponding to the received transmission conditioned to having been successfully received, wherein selecting one or more transmission types comprises selecting one or more of L1 ACK and L2/L3 ACK.

7. The network node of claim 6, the operations further comprising determining that a PUR reconfiguration is needed, wherein selecting the one or more transmission types comprises selecting a second transmission type for indicating feedback that uses a physical downlink control channel followed by physical downlink shared channel.

8. A method of operating a wireless device in a communications network, the method comprising:
   transmitting, using a preconfigured uplink resource (PUR) data to a network node in the wireless communication network; and
   receiving feedback that includes at least one of a plurality of transmission types, wherein the plurality of transmission types comprise one or more of L1 ACK and L2/L3 ACK.

9. The method of claim 8, wherein responsive to determining that a PUR reconfiguration is needed, the at least one of the plurality of transmission types comprises a second transmission type for indicating feedback that uses a physical downlink control channel followed by a physical downlink shared channel.

10. The method of claim 9, wherein the physical downlink control channel that is followed by a physical downlink shared channel comprises a layer 2 and/or a layer 3 feedback information.

11. The method of claim 10, wherein the layer 2 and/or layer 3 feedback information comprises an L2/L3 ACK indication and/or downlink data and/or re-configuration information.

12. The method of claim 8, wherein the feedback transmission uses a physical downlink control channel corresponding to a layer 1 feedback transmission and a physical downlink control channel followed by physical downlink shared channel corresponding to a layer 2/3 feedback transmission.

13. A wireless device operating in a communication network, the wireless device comprising:
   a processing circuit; and
   a memory coupled to the processing circuitry and having instructions stored therein that are executable by the processing circuit to cause the network node to perform operations, the operations comprising:
   transmitting, using a preconfigured uplink resource (PUR) data to a network node in the wireless communication network; and receiving feedback that includes at least one of a plurality of transmission types, wherein the plurality of transmission types comprise one or more of L1 ACK and L2/L3 ACK.

14. The wireless device of claim 13, wherein responsive to determining that a PUR reconfiguration is needed, the at least one of the plurality of transmission types comprises a second transmission type for indicating feedback that uses a physical downlink control channel followed by a physical downlink shared channel.

* * * * *